June 2, 1953     C. C. ROBB ET AL     2,640,584
AUTOMATIC COATING AND DRAINING MACHINE
Filed Jan. 16, 1948     8 Sheets-Sheet 2
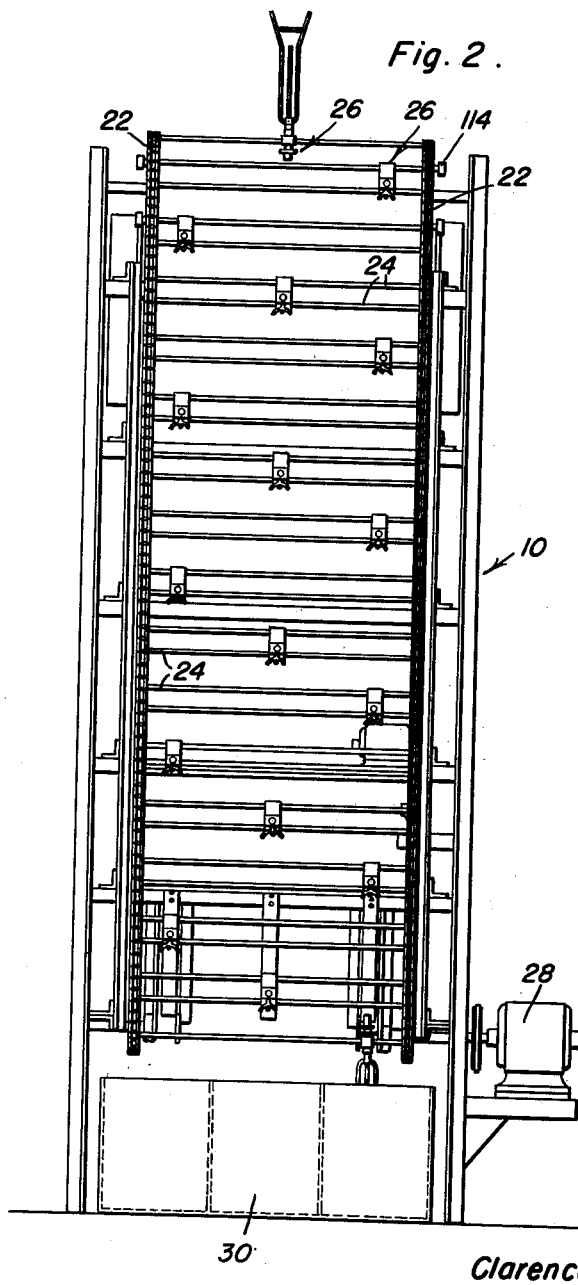
Clarence C. Robb
Haven M. Zimmerman
INVENTORS

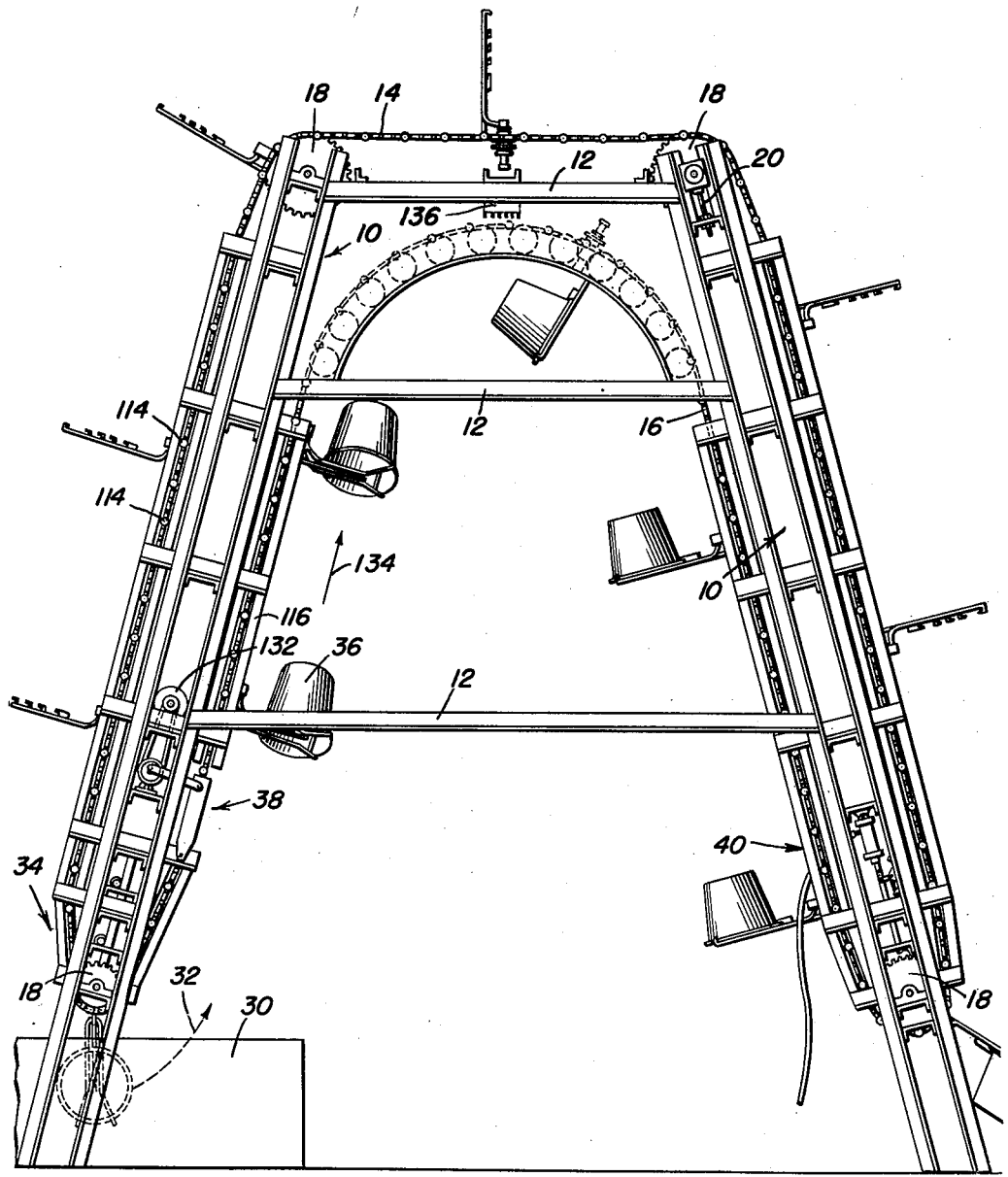

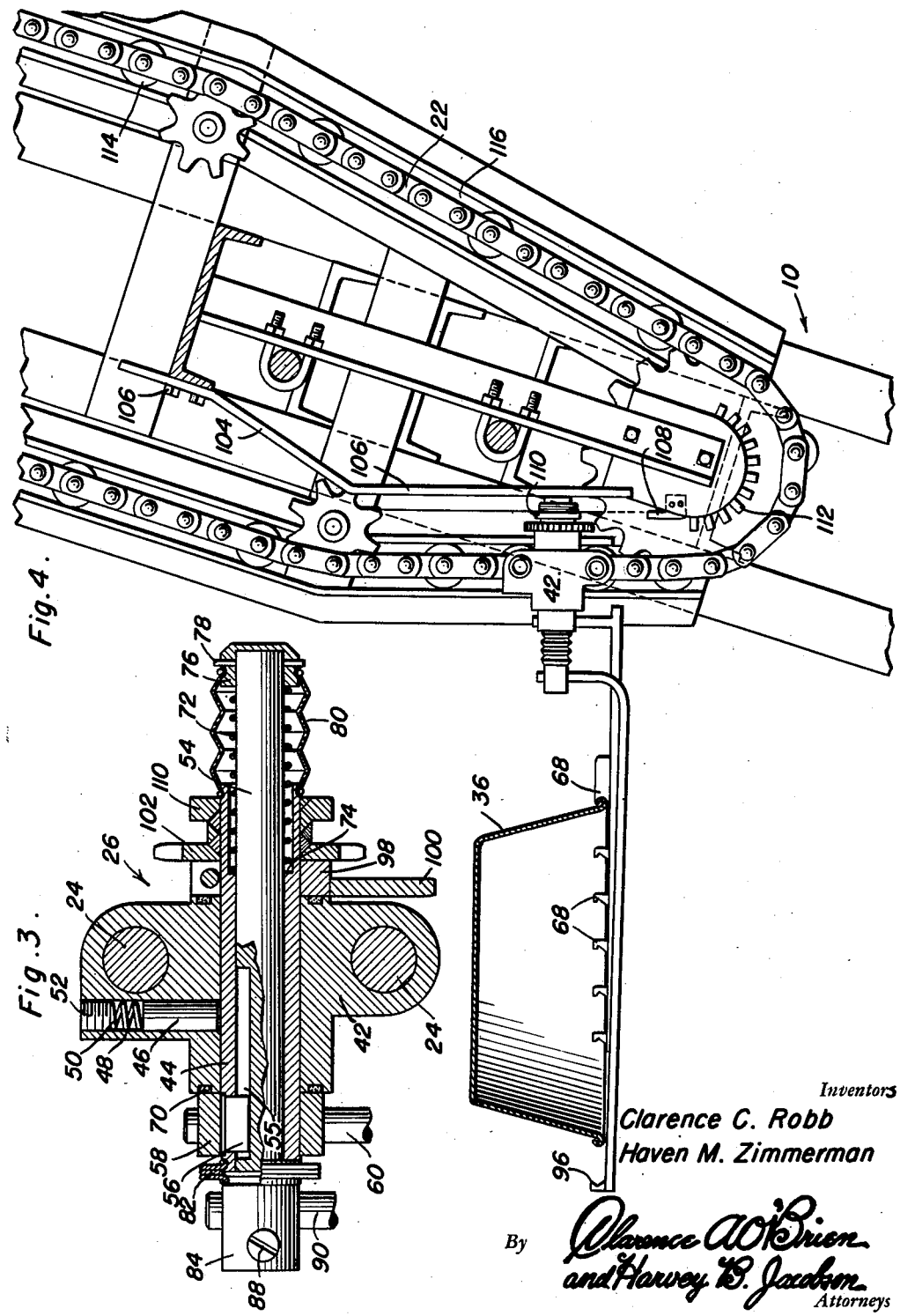

June 2, 1953  C. C. ROBB ET AL  2,640,584
AUTOMATIC COATING AND DRAINING MACHINE
Filed Jan. 16, 1948  8 Sheets-Sheet 4

Inventors
Clarence C. Robb
Haven M. Zimmerman
By Clarence A. O'Brien
and Harvey B. Jackson
Attorneys June 2, 1953 — C. C. ROBB ET AL — 2,640,584
AUTOMATIC COATING AND DRAINING MACHINE
Filed Jan. 16, 1948 — 8 Sheets-Sheet 5

Clarence C. Robb
Haven M. Zimmerman
INVENTORS

BY Clarence A. O'Brien
and Harvey B. Jacobson
Attorneys

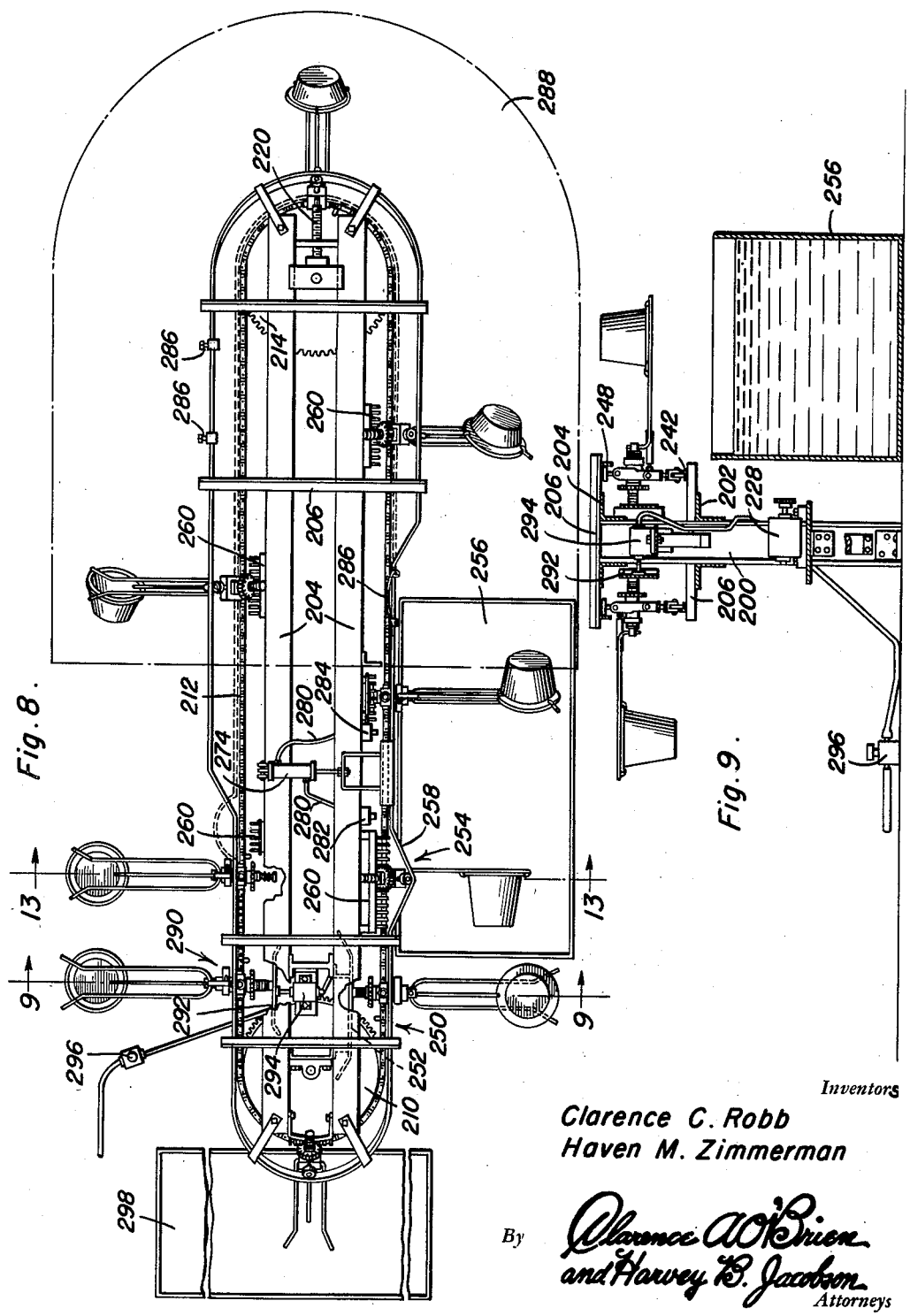

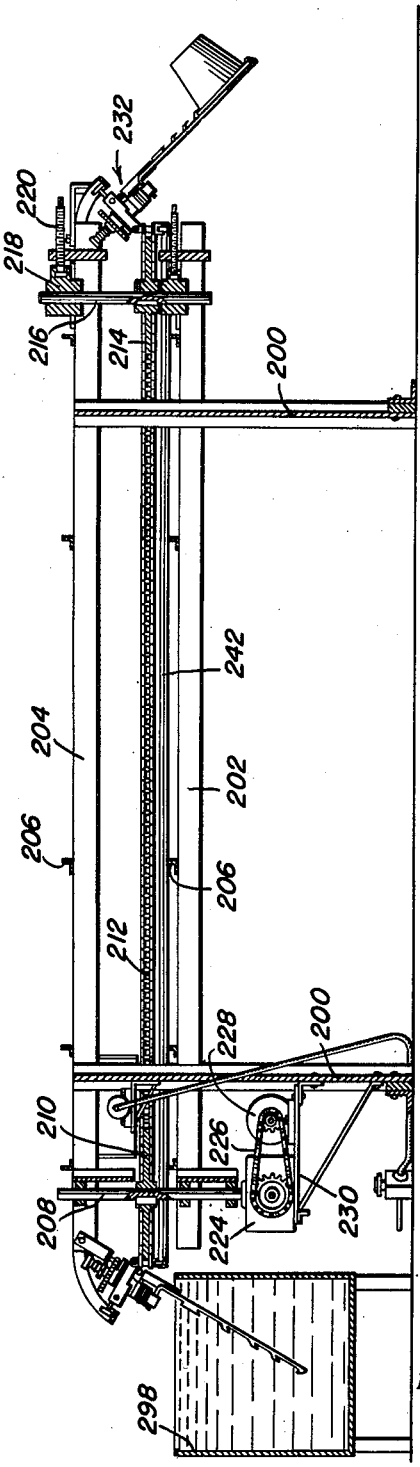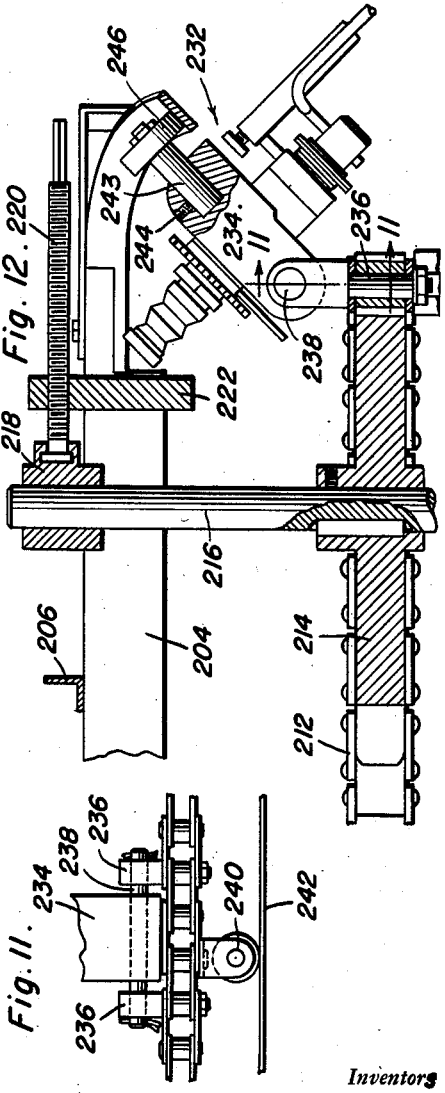

June 2, 1953  C. C. ROBB ET AL  2,640,584

AUTOMATIC COATING AND DRAINING MACHINE

Filed Jan. 16, 1948  8 Sheets-Sheet 8

Inventors
Clarence C. Robb
Haven M. Zimmerman

By *Clarence A. O'Brien*
*and Harvey B. Jacobson*
Attorneys

Patented June 2, 1953

2,640,584

UNITED STATES PATENT OFFICE 2,640,584

AUTOMATIC COATING AND DRAINING MACHINE

Clarence C. Robb and Haven M. Zimmerman, Dunbar, W. Va.

Application January 16, 1948, Serial No. 2,655

9 Claims. (Cl. 198—179)

This invention comprises novel and useful improvements in an automatic coating and draining machine and more specifically pertains to an apparatus for dipping articles into a tank containing a coating material such as paint, enamel slips or pottery glaze slips for coating the same, for removing excess enamel or paint from the articles and supporting tongs, for conveying the articles to a drier and delivering the articles to a discharge station, all in an improved manner.

The primary purpose of this invention resides in providing a mechanism for continuously conveying articles to a dipping tank for coating the same, for turning and shaking the articles for removing excess coating therefrom, and for automatically conveying the articles to a heating hood for drying the coating thereon and then delivering the articles at a discharge station.

A further important object of the invention resides in the provision of an improved mechanism for efficiently gripping the articles and conveying the same to the various stations for treatment, together with improved means for releasing the gripping means at the destination of the articles.

A still further important feature of the invention is the provision of mechanism for selectively turning and twisting the articles to facilitate drainage of excess coating material therefrom, for agitating the articles at various points throughout the travel of the same and for conveniently operating the article gripping means for opening or closing about an article as desired.

These, together with numerous other ancillary objects and features of the invention, which will be more particularly apparent as the following description proceeds, are attained by this device, preferred embodiments of which have been illustrated, by way of example only in the accompanying drawings, wherein:

Figure 1 is a front elevational view of one embodiment of the apparatus, certain concealed parts being indicated by dotted lines, and certain of the article carrying supports being omitted from the drawings for the purpose of simplifying the illustration of the principles of the invention;

Figure 2 is an end elevational view of the device shown in Figure 1, the articles being omitted from the article supports of the apparatus;

Figure 3 is a longitudinal sectional view through part of the mechanism of one of the article supports, the article gripping tongs being omitted therefrom, and illustrate the construction of the article support;

Figure 4 is an enlarged detail view of the loading station of the apparatus, and illustrates the manner of applying an article to the tongs of the article carrier;

Figure 8 is a top plan view of a modification of the apparatus showing the principles of the invention applied to a horizontal travel of articles effected by the mechanism;

Figure 9 is a transverse vertical section taken substantially upon the plane of the section line 9—9 of Figure 8;

Figure 10 is a vertical longitudinal sectional view through the embodiment of Figure 8;

Figure 11 is a detail view taken substantially upon the plane of the section line 11—11 of Figure 12;

Figure 12 is an enlarged detail view of a portion of the conveyor track of the mechanism;

Figure 5:
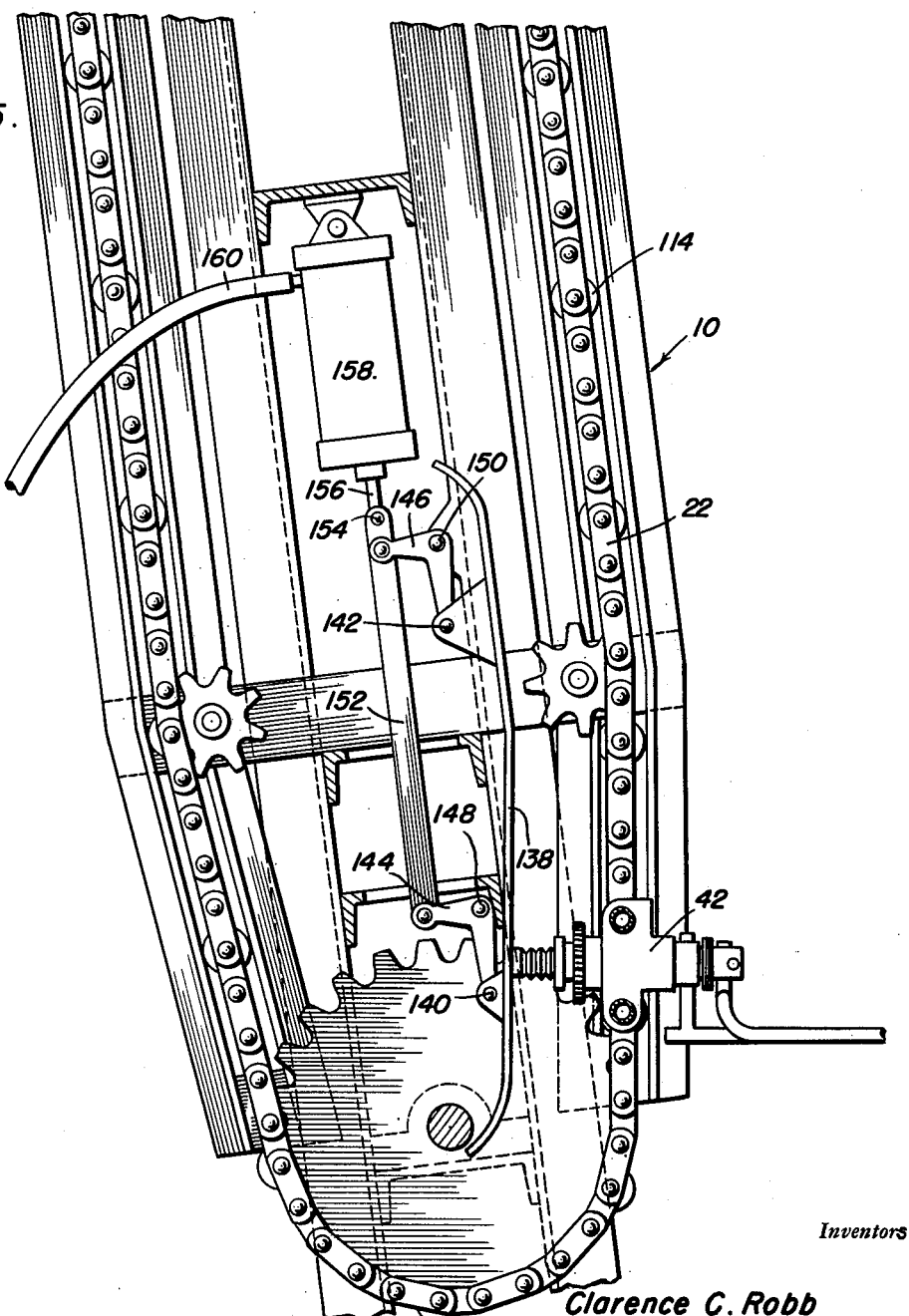
Figure 5 is an enlarged detail view, parts being indicated in section, of the article unloading station of the apparatus showing the mechanism for operating the carrier or article support for effecting the article releasing operation of the same.
Figure 6:
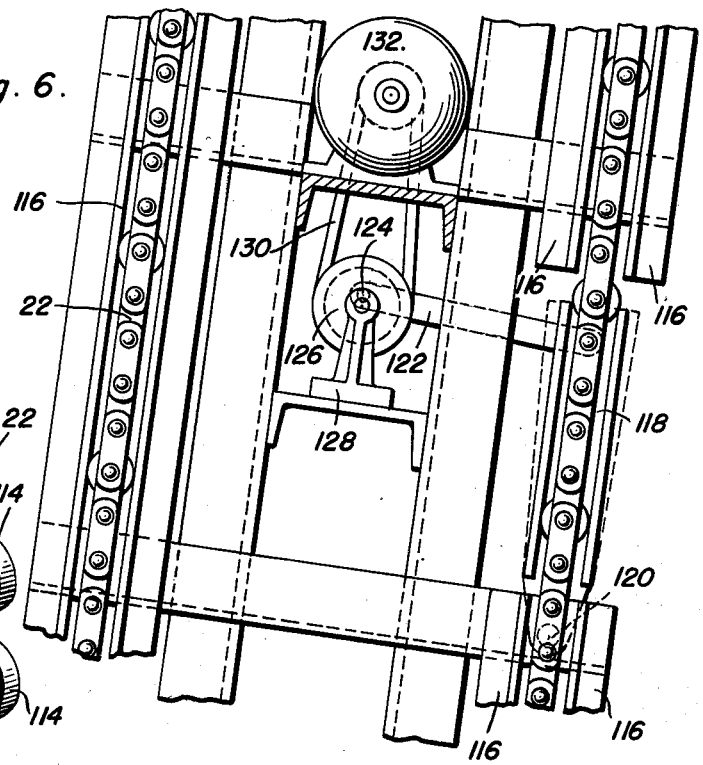
Figure 6 is a detail view on an enlarged scale of a portion of the article conveyor means, illustrating an agitating means for causing vibration of the article for shaking excess coating therefrom.

Referring now more specifically to the accompanying drawings, wherein like numerals indicate similar parts throughout the various views, attention is directed first to the embodiment of Figures 1-7 illustrating the principles of the invention applied to an apparatus for transporting the articles to be coated in a vertical plane by means of an endless conveyor.

There is indicated in Figures 1 and 2, a vertically disposed frame of A-shape and comprising the two upwardly and inwardly inclined leg members 10, connected by suitable cross-bracing 12 to form a rigid frame of any desired size and shape.

Entrained over the two side or leg members and top of the frame, are the two flights of an endless conveyor having an outer flight indicated generally at 14 and an inner flight indicated generally at 16 for purposes of convenience. As will be understood, the conveyor may be of any suitable construction and the principles of the invention are not limited to the embodiment of the conveyor chosen for purposes of illustration. This conveyor is entrained over suitable guide rollers journaled in the legs 10 of the frame, as indicated at 18. One or more of these guide rollers as indicated at 20 in Figure 1 may constitute a means for adjusting the tension and removing slack due to wear, in the endless conveyor.

One suitable form of endless conveyor with which to practice the principles of this invention, as indicated in Figure 2, may consist of a pair of laterally spaced chains 22, entrained over the above-mentioned roller means 18 which may comprise sprocket wheels for each of the chains, there being provided parallel laterally extending rods or bars 24 connected to the links of each of the chains and forming a ladder-type of endless conveyor therewith.

Preferably, although not necessarily, the bars 24 are positioned in closely adjacent pairs evenly spaced throughout the length of the chain, and each such pair of bars or rods has mounted thereon for transportation thereby, an article carrier indicated generally at 26. As will be readily seen by inspection of Figure 2, these article carriers may be provided in a plurality of longitudinally extending laterally spaced rows upon the conveyor, and preferably the carriers of the various rows are staggered with respect to each other, to thereby provide an even sequence of articles of different rows passing a given point. This arrangement is for convenience in enabling one operator to tend the machine handling a large number of articles at a relatively low rate of speed of travel of the conveyor, and yet providing adequate room between the articles for manipulating the same as set forth hereinafter.

Although but three rows of articles have been indicated in Figure 2, it will be understood that this showing is for the purpose of convenience, and that any suitable number of rows of article carriers may be provided upon the conveyor, without departing from the principles of the invention, since each of the article carries is identical with the rest, and the mounting thereon upon the conveyor is likewise similar for all.

As indicated at 28 in Figure 2, a motor may be provided for causing rotation of the conveyor, and of the articles carried thereby, the operative connection of this motor with the conveyor forming no part in itself of the invention and being of known and conventional design.

Positioned at the foot of one leg of the stand, is a coating containing tank 30 appropriately positioned for immersion of an article carried by one of the work holders within the tank for coating the article, during the travel of the article by the endless conveyor. Preferably the rotation of the conveyor is in the direction of the arrow 32 of Figure 1.

Briefly speaking, the operation of the device is as follows. With the endless conveyor moving in the direction of the arrow 32, the work holders 26, as they arrive at the loading station indicated at 34 in Figure 1, are automatically opened whereby an operator may place an article such as a pan or pail indicated generally at 36 throughout the drawings, upon the tongs of the work holder. Passing the loading station, the conveyor borne or conveyor carried work holder is now released from the holder opening means permitting the tongs to firmly grip the rim of the article, and the conveyor now carries the article into the tank 30 for coating the same. During the travel of the conveyor, article holder and article throughout the tank 30, the article holder is rotated in order to thoroughly turn the article within the coating material of the tank 30 for fully and completely coating the same, and as the article holder travels up the inner flight 16 of the conveyor, the work holders pass through an agitating station indicated at 38 for shaking the article and thus removing excess coating material therefrom. As the article travels up the inner flight 16 of the conveyor, the article is turned at intervals as desired by a mechanism to be subsequently set forth, in order that excess coating material or enamel may be removed from the rim of the article or from its edges in order to effect an even coating upon the article. At the top of the inner flight of the conveyor, the article holders are rotated through 180 degrees in order to invert the article for its descent, and at this portion of the article travel, if desired, a heating hood or chamber may be provided for drying the coating upon the article.

As the article holders of the inner flight 16 of the conveyor descend on the inner side of the other leg of the frame 10, they approach the unloading station indicated generally at 40, where the operator by a manual operating means effects the release of the article holding tongs of the article holder whereby the coated article may be removed from the conveyor.

Figure 7:
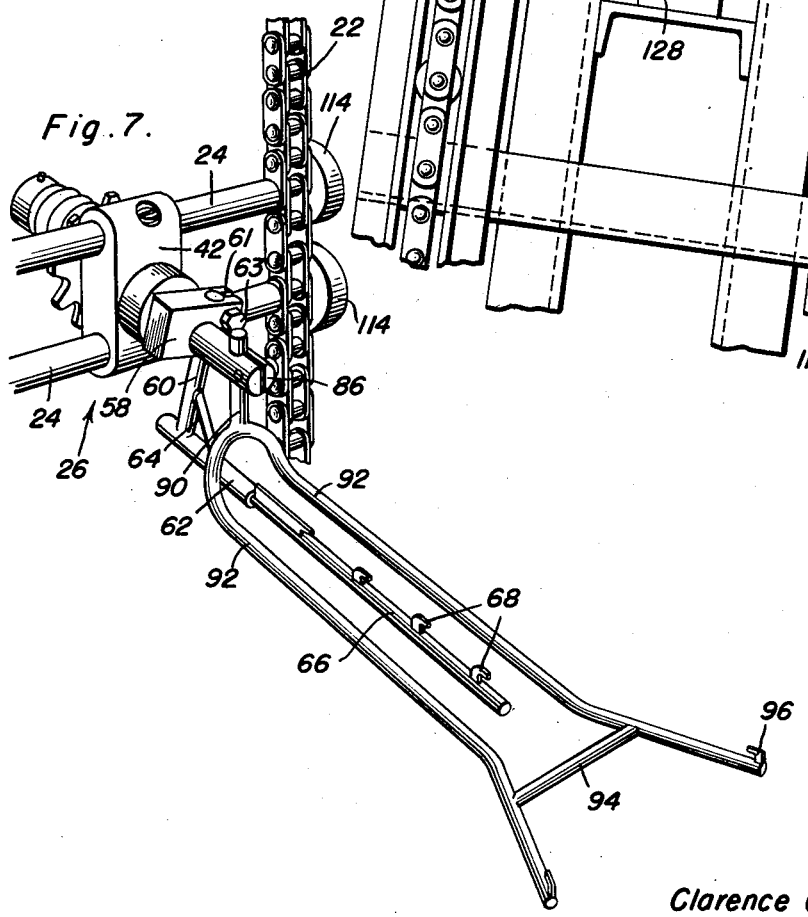
Figure 7 is a perspective view of a portion of one of the article supports and its article engaging tongs.

With the foregoing manner of operation in mind, attention is now directed more specifically to Figures 3, 4 and 7 for an understanding of the construction and operation of the article holders. Slidably received on each set of the parallel rods 24 of the endless conveyor, is a block or body member 42 of the carrier, provided with a bore perpendicular thereto and to the plane passing through the pairs of rods 24, which bore slidingly and rotatingly receives a sleeve or tubular member 44 which is frictionally retained against rotation in said bore as by means of a plunger 46 constituting a friction brake bearing against the outer surface of the sleeve 44. This plunger 46 is reciprocable in a bore 48 disposed perpendicularly to the body 42, and is urged as by a spring 50 into frictional engagement with the surface of the sleeve 44. The tension of the spring 50 is adjusted, as necessitated by various conditions of operation, by an adjusting bolt 52 screw-threaded in the outer end of the bore 48.

Slidably but non-rotatably mounted in the sleeve 44, is an axle or plunger 54 which is provided with a keyway 55 which receives slidingly a key member 56 by means of which a block 58 is non-rotatably but slidably keyed to the axle or plunger 54, and rigidly secured to the sleeve 44 by means of the key extending through an aperture in said sleeve and into a corresponding keyway in the block 58. Removably and adjustably carried by the block 58, is a perpendicularly disposed supporting rod or arm 60, which as shown in Figure 7 is received within a bore formed by a split or bifurcated slot 61 of the block 58, the arm being clamped in adjusted position in said bore as by a fastening bolt 63. From the lower end of the rod 60, and extending perpendicular thereto and parallel to the axle or plunger 54, is a forwardly extending arm 62 suitably braced as by a diagonally disposed reinforcing member 64 connected with the arm 60. The forward end of the rod 62 integrally or rigidly secured thereto is provided with a rod 66 provided with a plurality of forwardly facing hooks 68 for a purpose to be later set forth.

A frictional packing and sealing ring 70 is provided in the adjacent annular wearing surfaces of the block 58 and the body 42 as shown in Figure 3. The shaft or axle 54 and the sleeve 44 are retained in their normal position by means of a spring 72 surrounding the member 54, and seated in a recess 74 in one end of the bore of the tubular member 44, while the other end of the spring engages a spring retainer and actuating button 76 secured to the pin of the shaft 54 as by a fastening end 78. In order to protect the spring, and the ends of the bore from the ingress of dirt, paint or the like, a flexible, accordion-type housing 80 is provided of a cylindrical nature, whose extremities are secured to the actuating button 76 and to the end of the sleeve 44.

A similar housing 82 is secured to the other end of the sleeve 44, and an adjacent part of the extending extremity 84 of the shaft or axle 54. This extension 84, as shown more clearly in Figure 7, is preferably provided with a diametrical axial slot 86 to constitute a split clamp, which retains as by a fastening screw 88, a downwardly extending rod 90 therein. This adjustably secured rod 90, terminates in its lower end in a pair of forwardly extending forked members 92 which are disposed generally parallel to the rod 66, and which adjacent their outer extremities are provided with a transverse reinforcing member 94 for imparting rigidity to the arrangement. At the extreme outer end of the member 92, are provided inwardly turned hooks 96. The rods 60 and 90, thus support and terminate in tongs of which the hooks 68 and 96 are adapted to engage and retain the rim or lip of an article therebetween in firm gripping engagement, as indicated at 36 in Figure 4.

From the foregoing it will be seen that the tong members are spring-urged to closing position upon an article to be gripped therebetween, are keyed together to prevent relative rotation therebetween, and are rotatably and slidably mounted in the body of the carrier 26.

It will be seen, however, that the combined assembly of relatively reciprocable members 44 and 54, are rotatably mounted in the body 42 of the carrier 26, but are frictionally restrained against rotation in order to insure that they tend to remain in any rotational position for which they are set, or adjusted.

As will be seen by reference to Figure 3, a block 98 which may be of the split clamp type if desired is secured removably but rigidly upon the opposite end of the sleeve 44 from the block 58, and cooperates therewith to retain the sleeve 44 against sliding movement in the bore of the body 42. The block 98 is provided with an extending arm or projection 100 constituting a dog for a purpose to be later set forth. A sprocket wheel 102 is rigidly and non-rotatably carried by the extending end of the sleeve 44, for rotating the same together with the tong members in a manner and for a purpose to be later set forth.

It should be here noted that during the travel of the carrier 26 by the endless conveyor about the frame of the device, relative reciprocation of the tong members 60 and 90 may be effected by depressing the push button 76 at the end of the shaft 54, by means of fixed or movable cams as set forth hereinafter, to thereby relatively engage or release the tongs from an article gripped and carried thereby.

As shown generally at the station 34 in Figure 1, and as shown specifically in Figure 4, means are provided for automatically opening the tongs to receive or permit the positioning of an article to be carried by the conveyor therebetween, at the loading station. As shown in Figure 4, this means consists of a stationary cam member 104, secured to any suitable portion of the frame of the device as at 106. The portion 104 of the cam is inclined relative to the path of travel of the conveyor chain, whereby the push button 96 of the article carrier will be forced inwardly relative to the carrier, until the tongs are fully actuated or biased to their opened position against the yielding action of the spring 72. The cam is provided with a dwell portion 106, which maintains the tong members in their open position throughout a predetermined length of travel of the carrier upon the conveyor. At this time, the tongs are normally in position to receive the article to be carried thereby in an upright position resting thereon as shown at 36 in Figure 4, whereby the article may rest or repose upon the tong arms. It is, therefore, merely necessary for the operator to place an article 36 upon each of the tongs as the latter arrives at the loading station. As soon as the push buttons 76 pass from the end of the dwell portion 106 of the cam, the spring is released to close the tongs immediately. The tongs with the article securely gripped therein are now carried by the conveyor mechanism down into position for lowering the article in the tank of coating material in order that the article may be thoroughly coated thereby. It is a primary intention of the invention, to rotate the article during its immersion in the tank, in order to evenly and completely contact all surfaces of the article with the coating composition. For this purpose, the frame is provided at an appropriate point with an upstanding lug 108 which extends into the path of travel of a dog 110 carried upon the end of the shaft or sleeve 44, whereby the engagement of this dog with the lug will rotate the sleeve into proper position for the sprocket wheel 102 to engage the teeth of a rack 112 of suitable configuration and fixed in any desired manner to an appropriate portion of the frame of the device. Thus, as the conveyor chains carry the article carrier into dipping position in the tank, the engagement of the dog 110 with the lug 108 will rotate the sprocket wheel into proper position for the teeth 102 of the sprocket to engage the corresponding cogs of the rack portion 112 in proper meshing relation, to thereby prevent a wedging or binding action between the points of adjacent teeth of rack and sprocket. As the carrier is conveyed downwardly into and through and out of the tank, the cog wheel 102 rolling on the stationary rack 112 will cause a rotation of the tongs and the article carried thereby about the longitudinal axis of the tongs. This serves to thoroughly coat the article with coating or paint during its travel through the tank.

It should be understood that the rack portion 112 may be positioned in any desired location along the path of travel of the conveyor, but in proper operative position with respect to the painting or dipping tank.

As the article carrier emerges from the tank, and moves upwardly on the inner flight 16 of the conveyor, the article is now in its inverted position for proper drainage of excess coating therefrom. Preferably at a position upon the track shortly after the article emerges fully from the tank, the article carrier reaches the agitating station indicated at 38 upon Figure 1 and shown in more detail in Figure 6. To fully explain the operation of the agitating means, it should be noted that the ends of the rods 24 are provided with rollers 114 which constitute guide means sliding in channel-shaped guide members 116 rigidly carried by suitable support members mounted on the frame of the device. At a suitable location in the path of travel of the conveyor chains and article carriers, there is provided a channel-shaped guide section 118 which is pivoted as at 120 for oscillating movement as indicated in dotted lines in Figure 6 laterally of the longitudinal axis of the guide channels 116. As the guide rollers pass through this oscillatable channel section 118, they will be shaken and the article carrier and article carried thereby will also be agitated and shaken during transit of the guide rollers through this oscillating channel section. Pivoted to the other end of the agitating section 118, is a connecting rod 122 whose opposite extremity is connected to a crank 124 on a crankshaft having a pulley 126 thereon. The crankshaft is journaled in a suitable support 128 mounted in any desired manner upon the frame of the device, while the pulley 126 is connected by a belt 130 to a driving motor 132. As will readily be understood, during the operation of the device, the motor causes the channel section 118 to be constantly agitated, whereby each article carrier and its guide rollers pass through this section is shaken to dissipate excess enamel or coating from the article. Preferably, this agitating section is disposed over the enamel tank, whereby the excess coating shaken from the article will be dropped back into the tank.

It will be noted that as the article and article carrier pass upwardly on the inner flight 16 of the conveyor, the bucket moving in the direction indicated by the arrow 134 is in an inverted position, whereby the excess coating upon the interior and exterior thereof is permitted to drip off. However, as the bucket reaches the top of its travel, a second curved rack section 136 is encountered, which causes a rotation of the article carrier tongs to invert the bucket, whereby the excess coating material accumulating in the rim of the bucket is dispersed or dissipated as the carrier tongs and bucket are rotated through 180 degrees, preparatory to the article carrier moving down the other side of the inner track 16.

As the article carrier and the article treated descend on the opposite leg 10 of the frame, they eventually reach the unloading station indicated at 40. This station as shown best in Figure 5, is reached as the article carrier passes from the lower end of the inner flight and starts on the upward flight 14 of the conveyor. The article carrier unloading means at this station consists of a movable cam member 138, appropriately disposed to engage the operating buttons 76 of the article carriers, and depress the same to cause the tongs to release the article. Pivoted to the cam 138 as at 140 and 142, are a pair of bellcranks 144 and 146, journaled as at 148 and 150 to any suitable portions of the frame of the device. The other ends of the bellcrank arms are connected to an operating link 152 pivoted as at 154 to the end of a piston rod 156 whose piston, not shown, is reciprocable in a fluid pressure cylinder 158, and supplied with operating fluid by a conduit 160 under the control of any suitable control valve, operated by the tender of the device.

It should be recognized that various rack sections may be placed throughout the device for producing rotation of the article tongs and the article carried thereby at any desired point throughout the travel of the same, to more expeditiously remove excess coating from the article. Although but one loading cam and unloading cam have been indicated, it will be understood that these are of sufficient size and extent to engage each of the article carrier tongs operating buttons, throughout the various longitudinal rows of carriers. At the loading station, each of the carriers is automatically opened to receive an article placed thereon; while at the unloading station, the operator manually actuates the mechanism to cause the opening of the tongs as any desired article carrier reaches this station.

Attention is now directed more specifically to Figures 8-15 for an understanding of the second embodiment of the invention, wherein the article carriers and article supported thereby are caused to travel in an endless horizontally disposed path instead of a vertical path as in the first embodiment.

A plurality of supporting posts 200 are provided vertically positioned, and upon opposite sides of these posts are secured longitudinally extending upper and lower beams 202 and 204. Transverse spars or ribs 206 are disposed at suitable longitudinally spaced intervals upon the upper surfaces of the pairs of beams. A vertical driving axle 208 is suitably journaled at one end of the frame, and has fixedly mounted thereon a driving sprocket 210, around which is entrained a driving chain 212. The latter at its other end is entrained over a sprocket 214 rigidly carried by a vertical axle 216. The latter axle is mounted in suitable bearings 218, which are adjustable longitudinally of the frame for tensioning the chain, by a conventional type of chain adjusting means, consisting of a screw 220 rotatably carried by the bearings 218, and extending through a support or lug 222 carried by the frame members 202 and 204.

The driving axle 208 is driven by suitable gearing, not shown, contained in a housing 224, through the instrumentality of a chain driving mechanism 226 from a motor 228. The housing and motor are mounted upon a supporting platform 230 suitably carried by one of the pillars 200.

A plurality of article carriers 232 are mounted upon the endless chain 212 in a manner to be now described. Each of the article carriers 232 is provided with a body portion 234 which is provided with the identical structure set forth in the description of the article carrier 26 previously set forth, except for the means for mounting or attaching the article carrier to the conveyor. This fastening or support means, is shown best in Figures 11 and 12, and includes pairs of vertically extending pivot pin supports 236 carried by the sprocket driving chain 212, and extending thereabove. Between the supports of each pair, is provided a horizontally disposed fulcrum pin 238, upon which is journaled the above-mentioned body 234 for pivotal movement in a vertical plane as set forth hereinafter.

Extending below the endless chain 212, and positioned between each of the pairs of supports 236, is a guide supporting roller 240, which rolls upon the longitudinally disposed track 242 resting upon the transverse bars 206 of the lower beam 202. A stub axle 243 is detachably secured in the other end of the body member 234 opposite the pivot pin 238, as by means of a set screw 244, and upon the end of this axle is journaled a guide roller 246 which bears against the inner surface of a depending trackway 248 secured to the under surface of the upper set of transverse bars 206 of the upper beam 204. As will readily be seen by reference to Figures 8 and 9, the tongs of the article carriers are disposed outwardly of the supporting framework, whereby their weight causes the upper guide rollers 246 to bear against the inner surface and press outwardly thereon as indicated in Figure 9.

It will thus be seen that as the endless chain is rotated by the driving motor 228, the article holders and the articles carried thereby will be disposed and positioned in a horizontal plane laterally of the endless conveyor, throughout the normal travel of the device.

However, as in the previous embodiment, means are provided for causing rotation of the tongs of the article holders for the purpose of rotating the articles to assist in shedding excess coating therefrom, and causing a more even dispersion of the coating over the surface of the article, and to assist in drying the same.

Further, means are provided for automatically actuating the tongs to unload or open the same for receiving articles thereon, and for selectively opening the tongs to release the article therefrom, as well as further means for dipping the tongs into a washing bath for cleaning the same, and means for dipping the tongs and the article carried thereby into the enameling composition tank.

In addition to these substantially equivalent features to those in the preceding embodiment, the furnace means is provided for drying the enamel or painting coat on the article during its transit.

Figure 13:
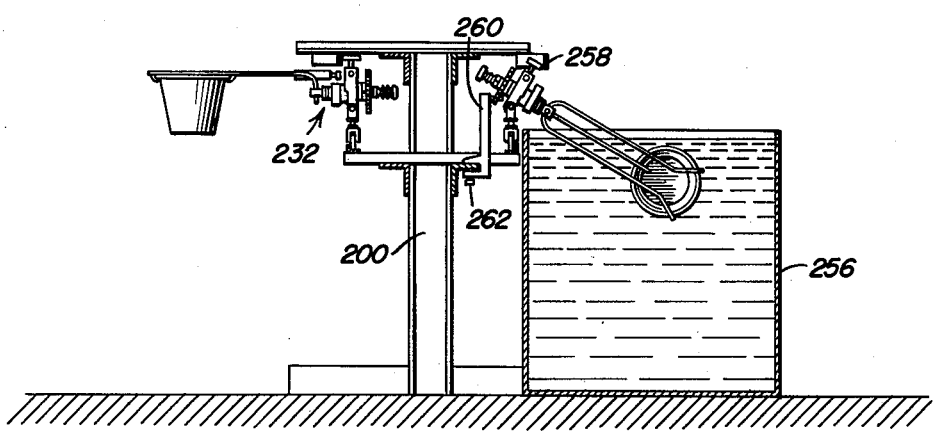
Figure 13 is a vertical transverse sectional view taken substantially upon the plane of the section line 13—13 of Figure 8.
Figure 14:
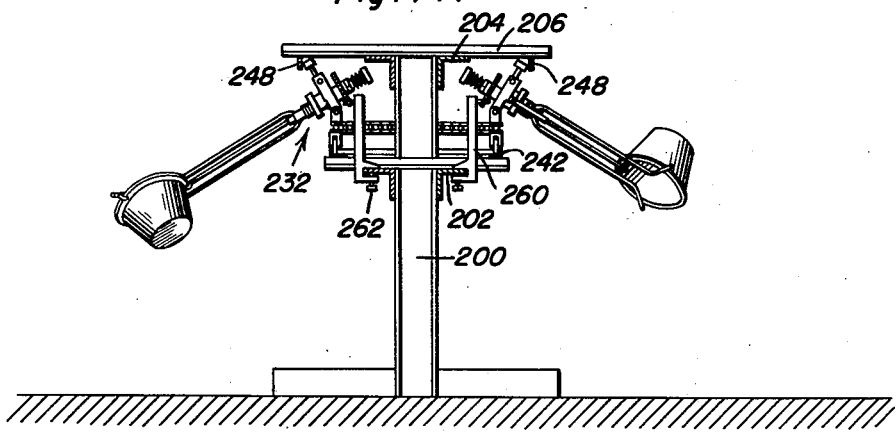
Figure 14 is a vertical sectional view illustrating the construction and operation of the work holder rotating means of the device.
Figure 15:
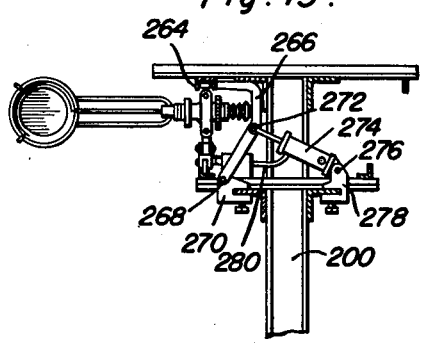
Figure 15 is a detail view illustrating the work holder oscillating mechanism of the apparatus.

At the loading station, indicated generally at 250 in Figure 8, the article holders engage with stationary loading cam 252 for causing opening of the tongs in order that the operator may place an article thereon. As soon as the article carrier passes the cam, the spring thereof causes the tongs to engage the rim of the article for holding the same securely. Upon further travel of the article to the position indicated at 254 in Figure 8, the article carrier and article are disposed above a tank 256 containing the enamel or coating composition. At this position, as shown in Figures 8 and 13, the upper guide rail 248 is curved outwardly as shown at 258, whereby the weight of the article carrier and article supported thereby are sufficient to cause the downward inclination of the same as shown in Figure 13, to permit the article to be immersed in the tank of coating composition. In order to positively effect this immersion operation, suitable rack sections 260 are secured removably and adjustably as by clamping screws 262 as shown in Figure 13 these rack sections engaging the cog wheels on the article carriers for rotating the same. Obviously, these rack sections may be placed at any desired point to carry out the desired function and to cause a rotation of the article carriers with the article during their immersions in the tank.

As the article is lowered toward the tank of coating material, it is completely immersed therein, turns and emerges with its leading edge having rotated through approximately 180°. The article enters and leaves the surface of the composition with the article surfaces at substantially 90° thereto to lessen the resistance to movement into and through the coating material. This also insures a thoroughly uniform and homogeneous coating on all surfaces of the article. As the article carrier passes the curved portion 258 of the guide track, and the article and tongs are lifted from the enamel in the tank, the carrier passes through an agitating section 264 of the track, for causing an oscillating and shaking motion of the carrier and article to more evenly spread the coating over the same, to shake surplus coating material therefrom, and assist in draining coating from the bottom and rim of the article. This agitating section 264 of the guide track is carried by an oscillating arm 266 pivoted at 268 to a clamp 270 secured to suitable parts of the frame of the device. This arm is oscillated by means of a piston rod pivotally connected thereto as at 272, the piston rod having a piston, not shown, but reciprocable in a fluid pressure cylinder 274, which cylinder is, in turn, pivoted to a supporting bracket as at 276, the bracket 278 being mounted upon another frame member of the device. The cylinder is supplied with fluid pressure by means of a conduit 280, this fluid pressure being controlled and regulated by means of two control valves operated automatically by the passage of the article carrier thereby.

These valves consist of control units 282 and 284, disposed respectively on the approach and departure side of the oscillating track in a position to be engaged and actuated by the body 234 or a member carried thereby of the article carrier. By this mechanism, the article carrier and element carried thereby are oscillated by a mechanism set in motion in response to the passage of the article carrier in proximity thereto, to shake the excess coating into the tank 256.

To further enhance the even spreading of the coating over the article, and remove excess coating therefrom, various detachable bumping elements 286 are secured to the guide track or tracks for agitating the article carriers as the same pass the obstructions. After leaving the tank 256, the article carriers pass within a heating hood indicated at 288 of any suitable construction, whereby a heating temperature is maintained for either partially or thoroughly drying the articles and coating material thereon during their travel therethrough. The actual construction of this heating hood, and the heating means therefor form no part of the present invention. As will readily be understood, however, it is contemplated that the article carrier shall be rotated, and if desired agitated and oscillated throughout the travel through the hood to further increase the drying of the coating thereon and the shedding of excess drops therefrom.

Emerging from the hood, the article carriers are in a horizontal position and are lowered by means of the curved track section to approximately 75° from the horizontal position. From this 75° position the carriers are rotated approximately 130° and immediately raised to their horizontal position, this action effecting an even and uniform application of the coating to the articles and the removal of excess coating therefrom. The carriers then approach the unloading station, indicated generally at 290 where an unloading cam of any desired type such as that indicated in the preceding embodiment, indicated at 292 and operated by a fluid pressure cylinder 294 may be manipulated to release the tongs.

The actuation of the cylinder 294 may be under the control of any suitable valve, such as that indicated at 296 whereby the air or the fluid pressure may be controlled in a supply to and exhaustion from the cylinder 294 to cause the cam to actuate the tong releasing means. As soon as the tongs pass the unloading station, they are carried over a cleansing tank 298 filled with any suitable tong cleaning fluid for removing the coating material therefrom. By a similar track and rack arrangement to that previously set forth, the tongs are lowered in the tank and rotated during their passage therethrough, in order to thoroughly cleanse the same, whereupon the retracted tongs are carried to the loading station and the cycle of travel repeated as above set forth.

Particular attention should be paid in this embodiment to the novel track arrangement whereby the elevation of the article carrier tongs is controlled throughout the travel thereof, by means of a fixed supporting track, upon the upper surface of which the supporting roller of the article carrier rides, together with an upper track section, which is of variable contour and against the inner surface of which the upper guide roller of the carrier bears. As will be seen, by changing the contour of the upper track element, the tongs may be inclined to any desired position, thereby raising or lowering the article carried thereby as desired.

It should be particularly noted that in the embodiment just described, the rack sections by means of their clamping means may be readily applied wherever desired about the path of travel of the endless conveyor, in order to adapt the apparatus to various particular operations which changes in the amount of rotation of the articles and in the position of the articles as the same pass various stations where particular treatment is to be imparted to the articles.

From the foregoing, it will be readily seen that numerous changes may be effected in the construction illustrated and described without departing from the fundamental principles of the invention, and accordingly it is not desired to limit the invention to the exact construction shown and described, but all suitable modifications and equivalents may be resorted to falling within the scope of the appended claims.

Having described the invention, what is claimed as new is:

1. An article holder comprising a body, a first shank rotatably mounted in said body, a second shank slidably received within said first shank, and article receiving tongs attached to said shanks, said second shank having a longitudinal groove extending within the surface thereof, said first shank having a key slidably received in said groove.

2. The combination of claim 1 wherein said first shank has a sleeve thereon abutting said body and overlying said key to retain the same.

3. The combination of claim 1 wherein said tongs include a first Y shaped tong, a second tong extending between the sides of said first tong, and article engaging hooks on said first and second tongs, and spring means engaging said tongs and yieldingly urging said tongs into article engaging position.

4. The combination of claim 3 wherein said spring means includes a head on one end of said second shank and a spring disposed between said head and the adjacent end of said first shank to yieldingly urge said shanks in opposite directions.

5. The combination of claim 4 wherein said first tong is secured to said second shank, and said second tong is secured to said first shank, said hooks on said first tong facing inwardly, and said hooks on said second shank facing outwardly.

6. The combination of claim 5 wherein said hooks have triangular shaped recesses in their article engaging edge.

7. A coating machine including a conveyor, an article carrying holder mounted on said conveyor, a first shank rotatably mounted in said holder, a second shank slidably received within said first shank, article receiving tongs attached to said shanks, a collar mounted on said first shank and abutting said holder, a dog on said collar, and angular pre-positioning means fixedly secured to said first shank for engaging said dog to rotate said tongs to a predetermined angular position.

8. An article holder comprising a body, first and second shanks rotatably mounted in said body, one of said shanks being slidably mounted in said body, means preventing rotation of one shank relative to the other shank, an article gripping tong carried by each shank, a brake mounted on said body and engaging said first shank to oppose rotation thereof, and means for agitating said holder and said tongs.

9. The combination of claim 1, a brake mounted on said body and engaging said first shank to oppose rotation thereof, and means for agitating said holder and said tongs.

CLARENCE C. ROBB.
HAVEN M. ZIMMERMAN.

References Cited in the file of this patent

UNITED STATES PATENTS

| Number | Name | Date |
|---|---|---|
| 545,429 | Lewis | Aug. 27, 1895 |
| 928,172 | Bernardin | July 13, 1909 |
| 1,659,522 | Ekvall | Feb. 14, 1928 |
| 1,708,429 | Mueller et al. | Apr. 29, 1929 |
| 1,759,502 | George et al. | May 20, 1930 |
| 1,941,152 | Noll | Dec. 26, 1933 |
| 2,336,401 | James | Dec. 7, 1943 |

FOREIGN PATENTS

| Number | Country | Date |
|---|---|---|
| 164,430 | Germany | Oct. 26, 1905 |